US005802319A

United States Patent [19]
Faulk, Jr. et al.

[11] Patent Number: 5,802,319
[45] Date of Patent: Sep. 1, 1998

[54] METHOD AND APPARATUS FOR EMPLOYING AN INTELLIGENT AGENT TO CAUSE A PACKET TO BE SENT TO UPDATE A BRIDGE'S FILTERING DATABASE WHEN A STATION IS MOVED IN A NETWORK

[75] Inventors: Robert L. Faulk, Jr.; Robert M. McGuire, both of Roseville; Karen E. Kimball, Sacramento, all of Calif.

[73] Assignee: Hewlett-Packard Company, Palo Alto, Calif.

[21] Appl. No.: 740,047

[22] Filed: Oct. 23, 1996

[51] Int. Cl.⁶ .................................................. G06F 13/00
[52] U.S. Cl. ............................ 395/200.79; 395/200.32
[58] Field of Search ................................ 370/254, 257, 370/401, 402; 395/200.32, 200.79

[56] References Cited

U.S. PATENT DOCUMENTS

| | | | |
|---|---|---|---|
| 5,222,064 | 6/1993 | Sagawa | 370/85.13 |
| 5,226,120 | 7/1993 | Brown et al. | 395/200 |
| 5,293,635 | 3/1994 | Faulk, Jr. et al. | 395/800 |
| 5,297,138 | 3/1994 | Black | 370/60 |
| 5,321,695 | 6/1994 | Faulk, Jr. | 370/94.1 |
| 5,337,309 | 8/1994 | Faulk, Jr. | 370/60 |
| 5,490,139 | 2/1996 | Baker et al. | 370/60 |
| 5,684,796 | 11/1997 | Abidi et al. | 370/389 |
| 5,724,346 | 3/1998 | Kobayashi et al. | 370/329 |

*Primary Examiner*—Lance Leonard Barry

[57] ABSTRACT

Uninterrupted network operation is maintained when stations are moved, for example when a station is initially connected to a bridge port via a repeater, and the station is later moved to another repeater, such that the bridge filtering database is typically out of date until the station transmits packets. To remedy this, an intelligent agent causes a packet to be sent on behalf of the station via the new network segment, and causes the bridge to learn the new port for the station, and to update its filtering database. The intelligent agent sends this packet immediately after the station has been moved from one network segment to another, thereby minimizing the possibility that traffic directed to the station is lost.

51 Claims, 5 Drawing Sheets

METHOD AND APPARATUS FOR EMPLOYING AN INTELLIGENT AGENT TO CAUSE A PACKET TO BE SENT TO UPDATE A BRIDGE'S FILTERING DATABASE WHEN A STATION IS MOVED IN A NETWORK

BACKGROUND OF THE INVENTION

1. Technical Field

The invention relates to electronic communications networks. More particularly, the invention relates to a method and apparatus for maintaining uninterrupted network operation when stations are moved.

2. Description of the Prior Art

A network segment consists of repeaters, stations, and connectivity between stations (for example, see standard ISO/IEC 8802-3 for information on Ethernet networks). A network segment has the capacity to transfer a limited amount of data per second. Data are transferred in the form of packets, which contain the address of the sending station (the source address) and the address of the intended recipient (the destination address).

When more than the maximum media speed of network data transfer capacity is required, multiple segments can be used. These segments can be interconnected through the use of bridges (bridges are defined in standard ISO/IEC 10038). The term switch has recently been applied to bridges. Switches are fast bridges which generally do not use a CPU to process the packets. Bridges contain two or more ports, each of which connect to a segment. When two stations on different segments communicate with each other, the bridge forwards the packets between the two segments. When the stations are on the same segment, the bridge does not forward the packets to any other segment. The bridge may buffer data received on its ports to allow forwarding of the data later onto a different segment that was busy when the transmission first occurred.

Bridges operate by examining the destination address of packets received on a given port, and forwarding the packet out via the port to which the destination station is connected. If the destination station is on the port from which the packet was received, the packet is not forwarded. Rather, the packet is said to be filtered.

Bridges learn the port to which each station is connected by examining the source address of packets as they are received from the station. They then store this address-port association in a filtering database. When a station is moved from one network segment to another, the filtering database is not updated until the bridge receives packets having the station's source address at the new port. During this period, the bridge continues to forward packets addressed to the station via the previous port. Thus, the station does not receive packets that are addressed to it. The result is a loss of network connectivity until the station transmits a packet so that the bridge can update its filtering database.

It would be desirable to provide a method and apparatus for maintaining uninterrupted network operation when stations are moved, such that there is no loss of network connectivity during the interval between moving the station and the transmission of a packet by the station.

SUMMARY OF THE INVENTION

The invention provides a method and apparatus for maintaining uninterrupted network operation when stations are moved. For example, where a station is initially connected to a bridge port, e.g. port 1 via a repeater, e.g. repeater 1. If the station is later moved to another repeater, e.g. repeater 3, the bridge filtering database is out of date until the bridge receives packets with the source address of the station. The invention provides an intelligent agent that sends a packet on behalf of the station when the station is first moved. This packet is sent via the new network segment, i.e. via repeater 3, and causes the bridge to learn the new port, i.e. port 3, for the station, and to update its filtering database accordingly.

The intelligent agent sends this packet immediately after the station has been moved from one network segment to another. Although any valid packet with a source address field of the station can be used for this purpose, a preferred packet is provided that is useful for an Ethernet network. The packet is readily modified for operation with other types of networks.

DETAILED DESCRIPTION OF THE INVENTION

Figure 1:
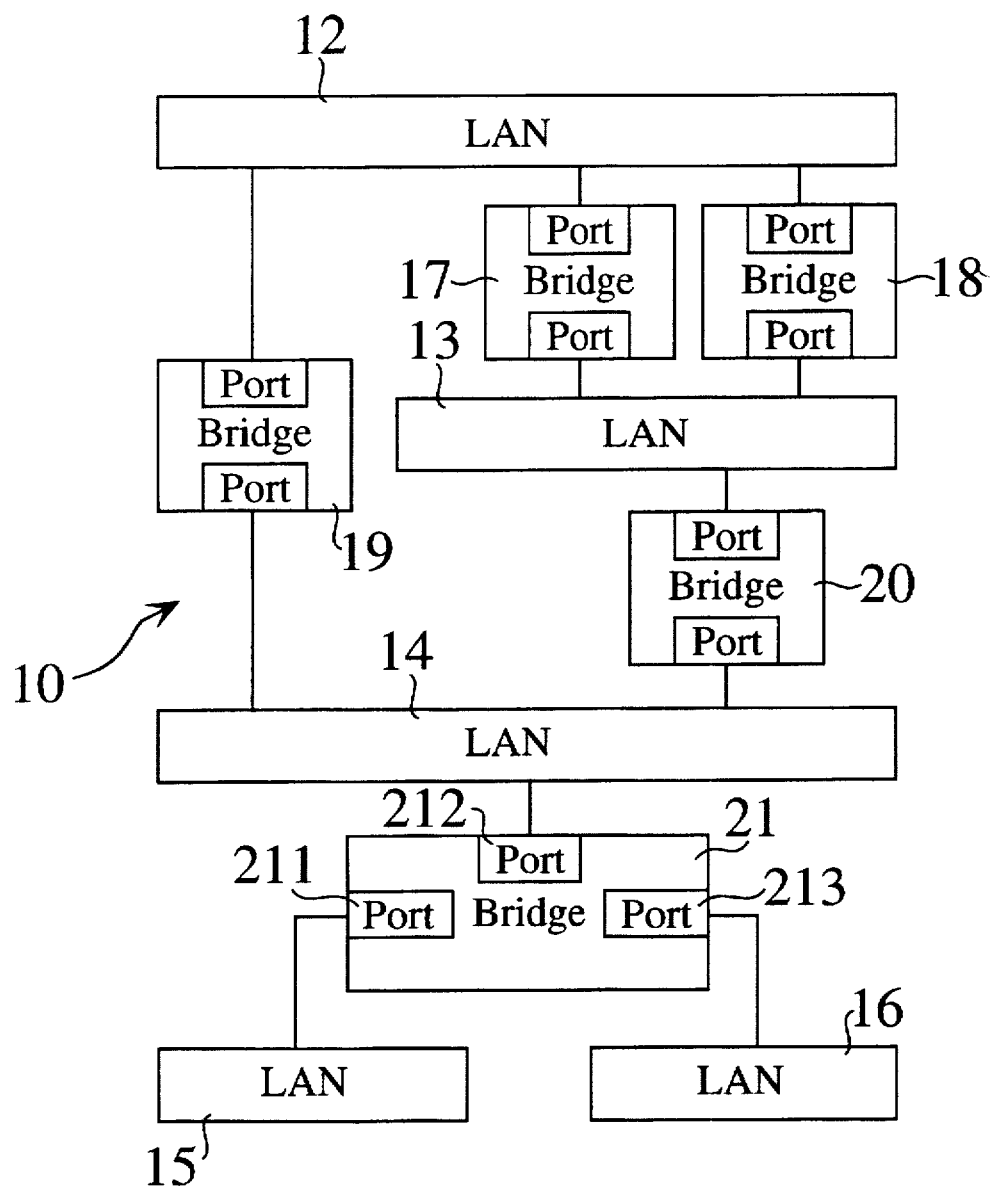
FIG. 1 is a block schematic representation of a typical electronic communications network, such as an Ethernet network, according to the prior art.

FIG. 1 is a block schematic representation of a typical electronic communications network, such as an Ethernet network. The network 10 consists of several Local Area Networks (LANs) 12–16, each of which is interconnected through a number of bridges 17–21. Each LAN is connected to one or more bridges. Connection between a LAN and a bridge is through a port. For example, ports 211, 212, 213 are shown in connection with the bridge 21. The principle functions of the bridge are to relay and filter data frames, maintain the information required to make frame filtering and relaying decisions, and management of the foregoing operations.

Although the preferred embodiment of the invention is discussed in connection with an Ethernet network, the invention can readily operate with networks other than Ethernet networks. In fact, the invention herein described can apply at least to FDDI, as well as any of the networks specified in the IEEE 802 family of networking standards (e.g. 802.3 and 802.5).

Figure 2:
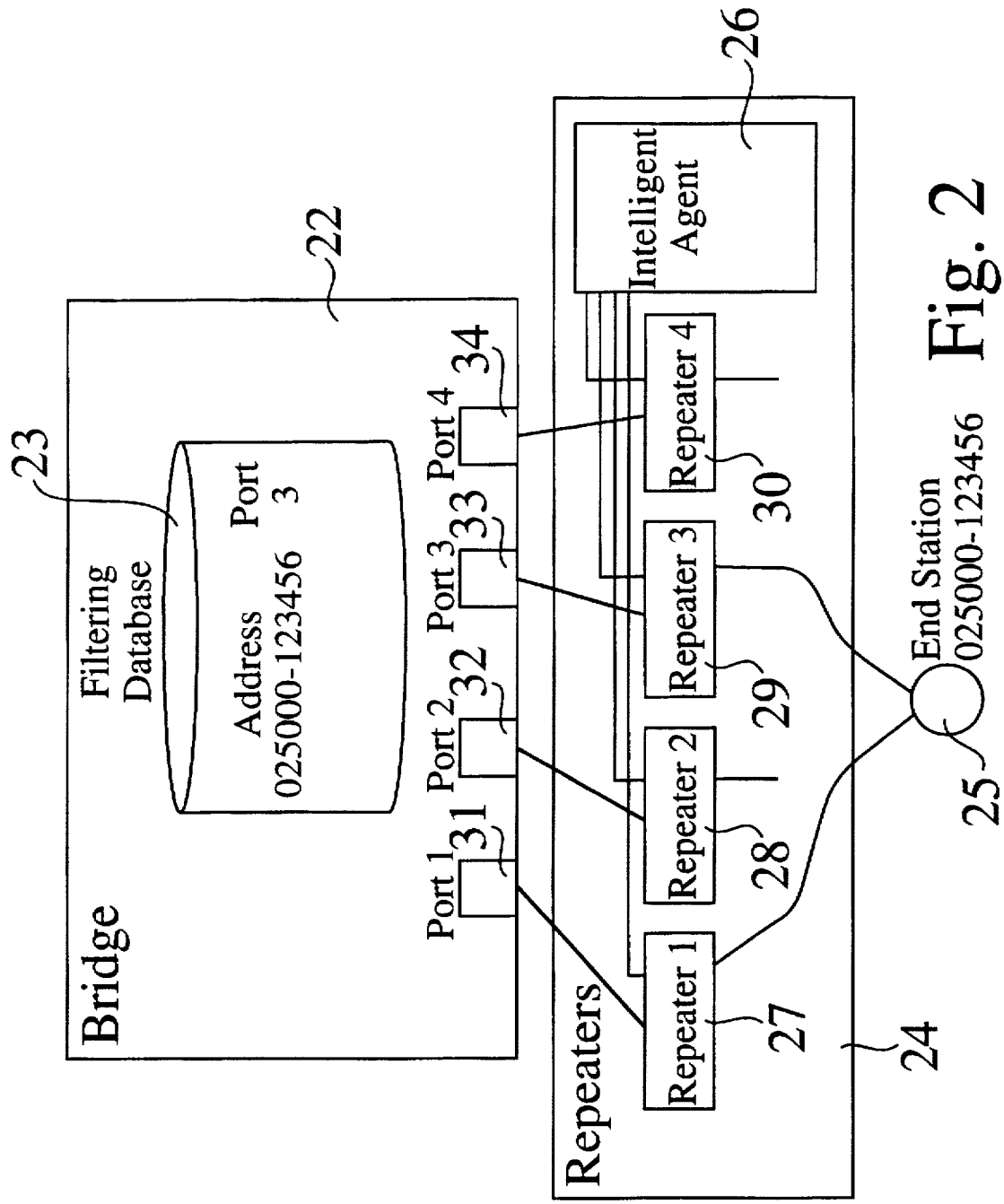
FIG. 2 is a block schematic diagram of an electronic communications network that includes a bridge having a filtering database, a plurality of repeaters, and an intelligent agent that maintains uninterrupted network operation when stations are moved, according to the invention.

FIG. 2 is a block schematic diagram of an electronic communications network that includes a bridge 22 having a filtering database 23, a plurality of repeaters 27–30, and an intelligent agent 26 for providing uninterrupted network operation when station 25 is moved. For example, where a station 25 is initially connected to a bridge port, e.g. port 1 (31) via a repeater, e.g. repeater 1 (27). If the station 25 is later moved to another repeater, e.g. repeater 3 (29), the bridge filtering database 23 is out of date until the bridge 22 receives packets with the source address of the station 25, e.g. 025000-123456. The invention provides an intelligent agent 26 that automatically causes a packet to be sent by, or on behalf of, the station after the station has been moved. This packet is sent via the new network segment, e.g. via repeater 3 (29), and causes the bridge to learn the new port, i.e. port 3 (33), for the station, and to update its filtering database 23.

The intelligent agent sends this packet immediately after the station has been moved from one network segment to another. Although any valid packet with a source address field of the station can be used for this purpose, a preferred packet is provided that is useful for an Ethernet network (discussed below). It will be appreciated by those skilled in the art that the packet is readily modified for operation with other types of networks.

The invention ensures that network connectivity is not interrupted when stations are moved from one network segment to another. A single Ethernet network segment has a bandwidth of 10 megabits of data per second. An Ethernet network consists of repeaters and network cables that connect the repeaters together, as well as nodes that connect to the network cables (see FIG. 1). If more than 10 megabits per second of throughput is needed, it is possible to add more Ethernet networks to the system. These Ethernet networks are interconnected via bridges or routers. For the invention herein disclosed, bridges are used to connect the Ethernet networks together.

Each of the four repeaters 27-30 shown on FIG. 2 is its own Ethernet network. A station can be disconnected from one repeater and moved to another repeater, either through a manual operation by moving a cable from one repeater to another repeater, or through an automated operation, all as is known in the art. Although the repeaters are all shown as contained in a single box 24, they could also be stand-alone, external repeaters, in which a user manually unplugs a station connection from one repeater unit and plugs the station connection into another repeater.

One problem the invention addresses, as discussed above, occurs where a bridge 22 forwards one or more packets from one Ethernet network to another by looking at the destination address of each packet as the packet is received on the bridge's ports 31-34. That is, the bridge receives the packet, looks at the destination address, and forwards the packet via a bridge port to the destination. For example, if a packet is sent to station 025000-123456 (25), the bridge forwards the packet via port 1 (31) to repeater 1 (27). Later, if the station is moved to repeater 3 (29), which is connected to port 3 (33), and a packet is sent to this station 025000-123456 (25), the bridge 22 continues to send the packet via port 1, even though the station is now connected to repeater 3. Accordingly, the station does not receive the packet. The invention is especially useful where the station is not aware it has been moved (as is usually the case) and, therefore, has not sent a packet notifying the bridge of its new location.

Normally, a bridge updates the filtering database in accordance with the source address of received packets. When a station sends a packet, the bridge looks at the source address of the packet, sees the source address on a given port, and updates the filtering database. In this example, when the station is moved from repeater 1 (27) to repeater 3 (29), the filtering database has bridge port 1 (31) recorded as the destination port until a packet having a source address of the station is received on bridge port 3 (33). Thus, when a station is moved from one bridge port to another bridge port, it does not receive traffic until it sends a message. As stated above, the invention provides a technique that makes the bridge quickly learn that the station has moved.

The invention comprises an intelligent agent that is invoked when the system becomes aware that a station has moved. Such awareness may be achieved by any known means, e.g. by detecting electronic switching from one repeater to another to move the station, or by direct invocation through a procedure call as part of a multi-step process, for example as part of a larger software program. When such movement occurs, the intelligent agent transmits a learning packet that, in the example of FIG. 2, is received at the port, i.e. port 3, of the bridge that corresponds to the new station location. The learning packet has a source address which is that of the station, and the bridge then updates its filtering database accordingly.

Figure 3:
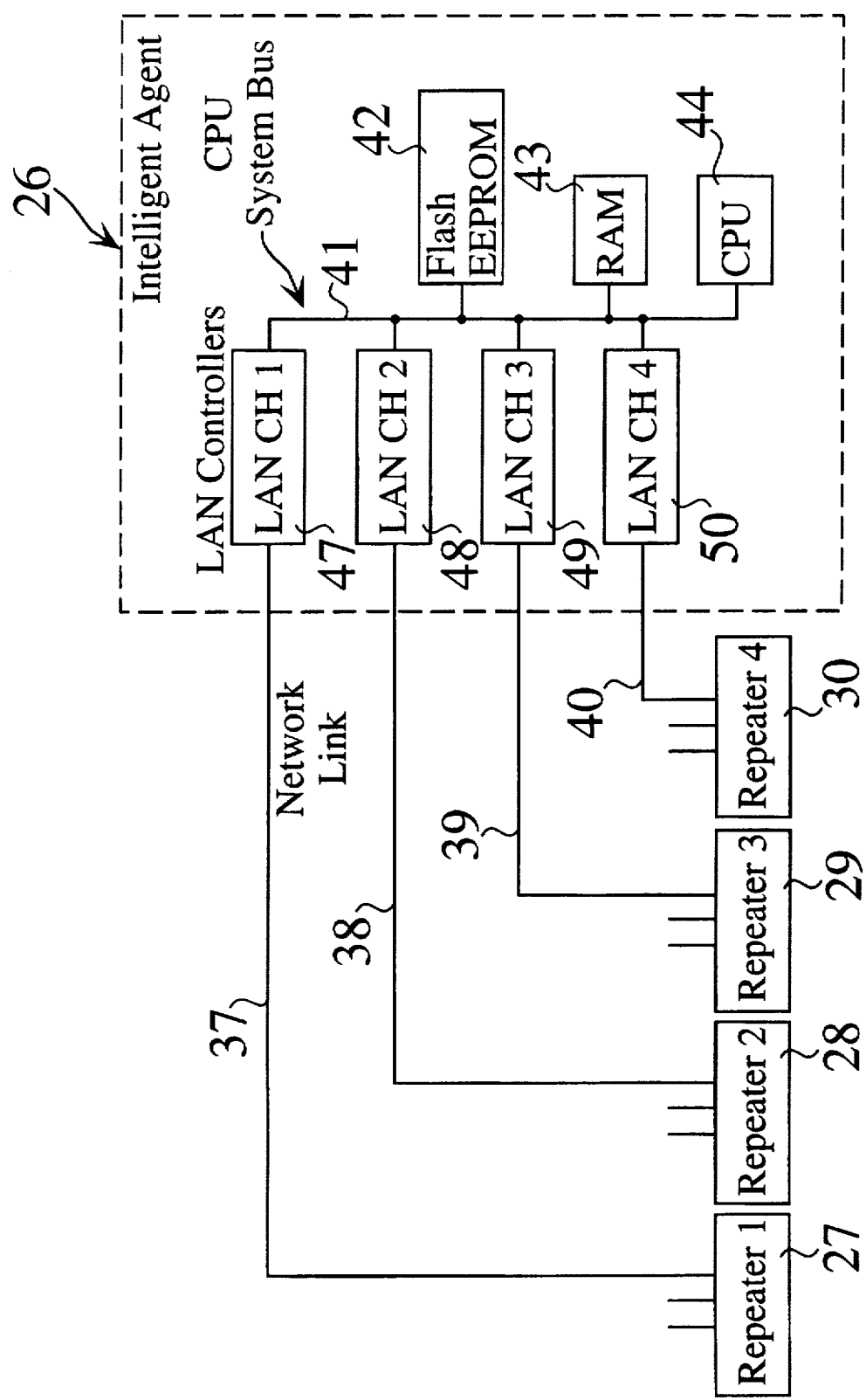
FIG. 3 is a simplified block schematic diagram of an apparatus for maintaining uninterrupted network operation when stations are moved, according to the invention.

FIG. 3 is a simplified block schematic diagram of an apparatus for maintaining uninterrupted network operation when stations are moved according to the invention. In this embodiment of the invention, the intelligent agent includes a CPU 44, random access memory 43, a flash EPROM 42, and a plurality of LAN controllers that are interconnected via a CPU system bus 41. The intelligent agent may also include a software program that may be stored in the flash EPROM and/or random access memory, and that is executed by the CPU.

This embodiment of the invention may be used in a network, such as that shown on FIGS. 1 and 2. Such network includes a plurality of repeaters 27-30 that are linked to the LAN controllers 47-50 at the intelligent agent 26 via corresponding network links 37-40. The intelligent agent becomes aware of the movement of a station from one repeater to another (as discussed above) and sends a learning packet over the appropriate network links 37-40, thereby causing the bridge in question to update its filtering database.

Figure 4:
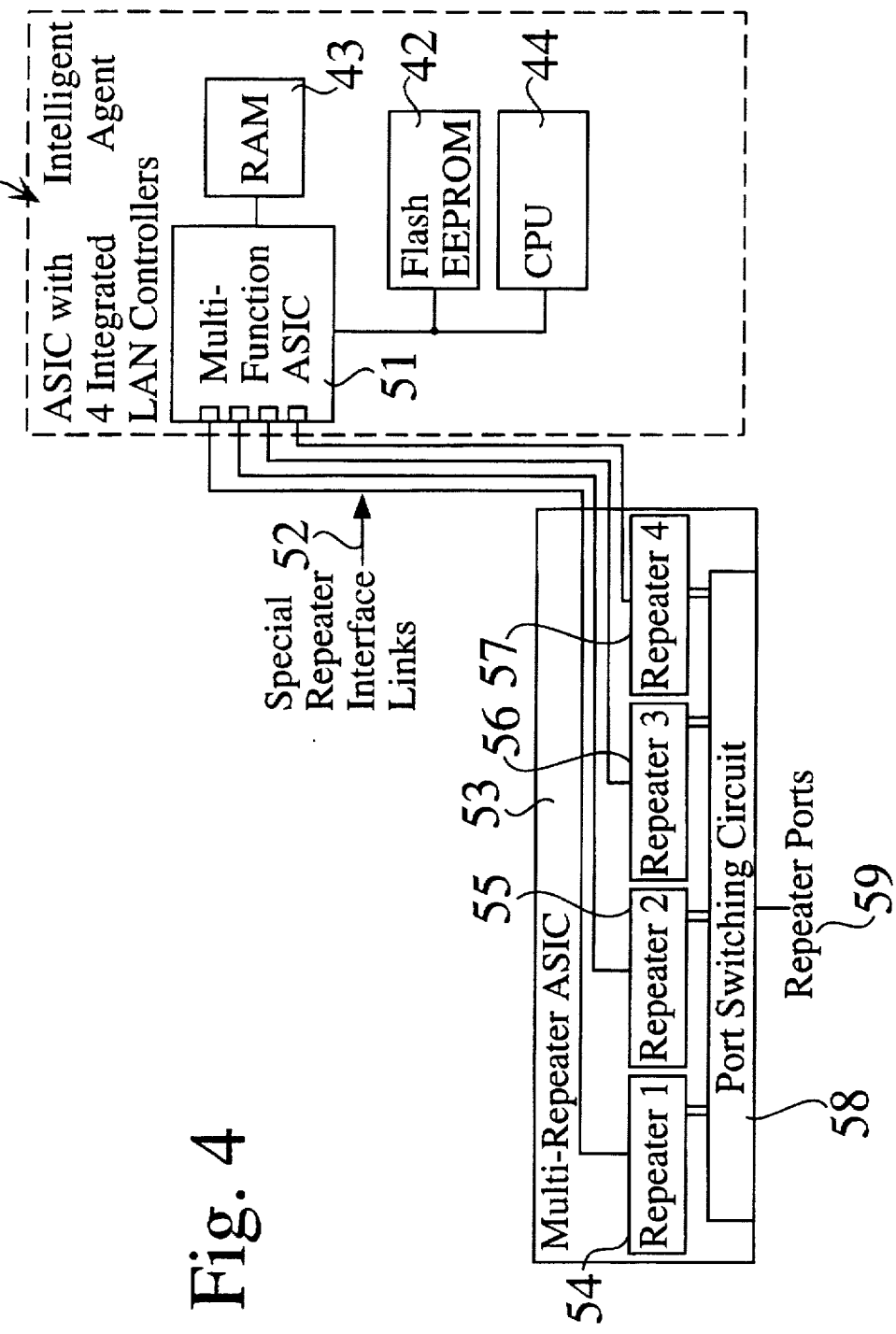
FIG. 4 is a block schematic diagram of a preferred apparatus for maintaining uninterrupted network operation when stations are moved, according to the invention.

FIG. 4 is a block schematic diagram of a preferred apparatus for maintaining uninterrupted network operation when stations are moved according to the invention. In this embodiment of the invention, the intelligent agent includes a CPU 44, random access memory 43, and a flash EPROM 42 that are connected to a multi-function application-specific integrated circuit ("ASIC") 51 that includes a plurality of integrated LAN controllers.

This embodiment of the invention may be used in a network, such as that shown on FIGS. 1 and 2 where the repeaters are integrated into a multi-repeater ASIC 53. Such ASIC includes a plurality of repeaters 54-57 that are linked to the integrated LAN controllers at the intelligent agent 26 via special repeater interface links 52. The multi-repeater ASIC also includes a port switching circuit 58 that controls assignment of stations to the repeater ports 59. The intelligent agent becomes aware of the movement of a station from one repeater to another (as discussed above) and sends a learning packet over the appropriate repeater interface link 52, thereby causing the bridge in question to update its filtering database.

Figure 5:
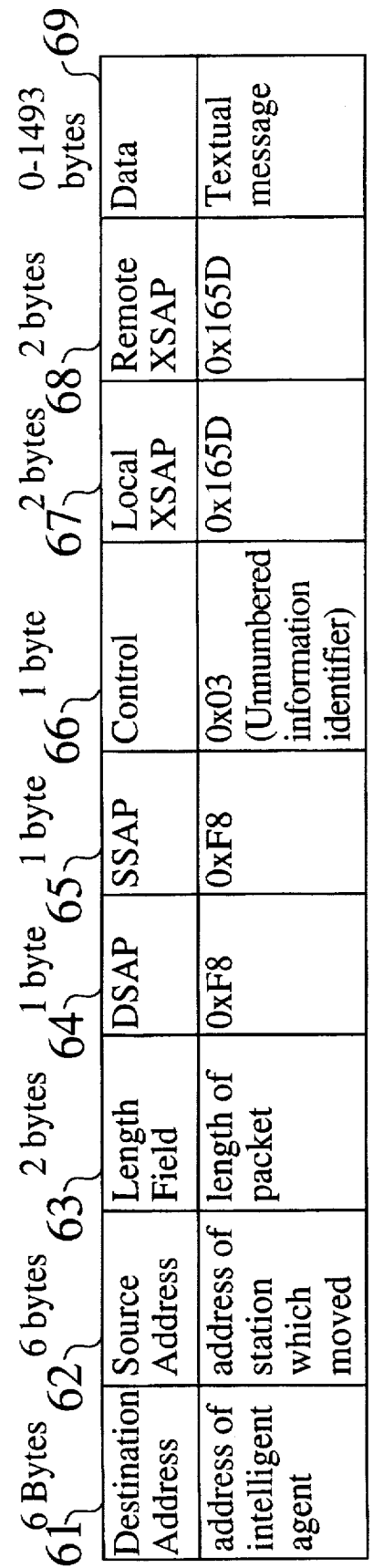
FIG. 5 is a diagram showing the format of a learning packet that implements uninterrupted network operation when stations are moved, according to the invention.

FIG. 5 is a diagram showing a learning packet 60 that is sent to implement uninterrupted network operation when stations are moved according to the invention. The learning packet includes a destination address 61, which is the address of the intelligent agent. In the preferred embodiment of the invention, the learning packet is sent to the agent on the segment to which the end station was moved so that the bridge will not forward the packet to other segments. This reduces the amount of network bandwidth used.

The source address 62 contained in the learning packet is that of the station that has moved.

The length field 63 of the learning packet indicates a valid length for the learning packet for such purposes as error detection.

Some of the other fields that may be included in the learning packet, such as DSAP 64, SSAP 65, and Control 66, are well defined in the art, and are reserved values that prevent the agent (or other intelligent network entities) from performing special processing if it receives the learning packet. Thus, when the intelligent agent receives the learning packet, it knows not to take any harmful action. If different data, such as an IP packet, are used inside the learning packet, the intelligent agent can be made to take a desired action.

Near the end of the learning packet, there is a data field 69 that may include a text message. For example, if a network administrator is examining packets on the network, and the network administrator sees the learning packet, the data field can inform the network administrator that the packet is a learning packet that was sent by the intelligent agent as a result of moving one or more stations.

The key attributes of a preferred learning packet are as follows, listed in presently preferred order of importance:

- It is error-free and conforms to standards established for the specific type of network in use. Such standards define such parameters as packet format. For example, on an Ethernet network the learning packet is preceded by a preamble and start of frame delimiter, and is followed by a valid frame check sequence (FCS) and an end of frame delimiter.
- It contains the source address of the station that has moved.
- It contains the destination address of a device which is known to be unaffected by receipt of the learning packet, such as the intelligent agent or some other designated device which is known to be unaffected.
- It may contain an ASCII text message in the data field that informs network support personnel of the purpose of the learning packet, should the packet be examined with network analysis test equipment.
- It may include SSAP, DSAP, Control, and XSAP fields having defined values so that the learning packet is correctly identified by the intelligent agent when it is received.
- It can have the specific destination address that is used by the intelligent agent on the segment to which the end station was moved, so that it is not needlessly forwarded to any other segment.

The learning packet should be transmitted as soon as possible after the station is moved to reduce the period of time during which the bridge can fail to forward packets correctly to the destined station.

The destination address field in the packet is set to the destination address of the agent for that new segment. In this embodiment of the invention, the intelligent agent has four addresses, such that the agent sends a learning packet when the station is moved, e.g. to repeater 3 (FIG. 2), where the source address of the learning packet is that of the station that has moved and the destination address is that used by the intelligent agent on the segment to which the end station was moved (e.g., segment 3). In this example, if the intelligent agent had instead used a destination address of repeater 4, and then sent the learning packet, the learning packet would be forwarded by the bridge to repeater 4, thereby wasting bandwidth on the network. A key aspect of the learning packet, however, is that it is error free and it contains the address of the station that was moved.

The invention therefore provides a mechanism in which:

- The intelligent agent becomes aware of the reassignment of a station from one repeater or one network to another. In this embodiment of the invention, there are four three-port repeaters. However, any number of repeaters having any number of ports may be used in connection with the invention;
- Once the intelligent agent determines that there is a reassignment, it determines the source address of the moved station, as well as the new port for that source address;
- The intelligent agent then sends a learning packet containing the source address of the station that was moved. The learning packet is sent on the new segment for the station;
- The learning packet is received by the bridge, and the bridge learns the new station address;
- The bridge's filtering database is updated, and the station can then receive packets.

One of the key requirements is that the intelligent agent has the ability to send messages to any one of the segments associated with the bridge. This requires that the agent has a sufficient number of LAN controllers to address each of the bridge segments, i.e. one for each network segment, such that the agent can send and receive messages between the LAN controllers and the repeaters.

Another embodiment of the invention provides one LAN controller and a switching device, e.g. a one-to-four type switch. In such an embodiment of the invention, first the agent selects an interface through which to send the learning packet, and then it instructs the LAN controller to send the learning packet.

Another embodiment of the invention provides four LAN controllers, one for each repeater, that are connected to the intelligent agent. The LAN controllers include a DMA and a connection to the system bus, where the intelligent agent is connected to the system bus (see FIG. 3).

Yet another embodiment of the invention provides four LAN controllers embedded in an ASIC, connected to the four repeaters via special repeater interface links (see FIG. 4).

The LAN controller does not necessarily inform the intelligent agent that the station has moved. The agent can be informed through another method. In the preferred embodiment of the invention, there is a port switching circuit (58) that allows a station to be connected to any one of the four repeaters through an electronic means, such that the station can be moved electronically. However, as discussed above the station could also be moved physically. Either way, the intelligent agent may be informed of the station move using known hardware or software network management techniques.

The LAN controller actually transmits the learning packet onto the network. The CPU builds the learning packet in the RAM and then it instructs the LAN controller to read the packet from RAM and transmit it to the network. The learning packet is sent to the repeater and then on to the bridge. The intelligent agent uses the LAN controller to assert control over the repeater to which the station is moved to transmit the learning packet to that same repeater, and thence to the bridge, to allow the bridge to learn that the station has moved, as well as the new location of the station.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for maintaining uninterrupted network operation when stations are moved, comprising the steps of:

providing an intelligent agent, said intelligent agent causing a packet to be sent by, or on behalf of, a station when said station is first moved via a new network segment;

causing an associated bridge to learn said station's new location; and causing said bridge's filtering database to be updated accordingly.

2. The method of claim 1, wherein said intelligent agent sends said packet immediately after said station has been moved from one network segment to another.

3. The method of claim 1, wherein said network is an Ethernet network.

4. The method of claim 1, further comprising the steps of:

becoming aware of a station being moved; and thereafter causing transmission of a learning packet that is received at a port of the bridge that corresponds to a new station location.

5. The method of claim 1, wherein said packet has a source address which is that of said station.

6. The method of claim 1, wherein said intelligent agent comprises either a software-controlled CPU and memory, or an application specific integrated circuit, that are interconnected with a plurality of LAN controllers via a system bus.

7. The method of claim 1, wherein said network comprises a plurality of repeaters that are linked to LAN controllers at said intelligent agent via corresponding links.

8. The method of claim 7, wherein said intelligent agent has become aware of when a station is moved from one repeater to another and causes a learning packet to be sent over an appropriate link to cause a bridge in question to update its filtering database.

9. The method of claim 1, wherein said intelligent agent comprises either a software-controlled CPU and memory, or an application specific integrated circuit, that are connected to a multifunction circuit that includes a plurality of LAN controllers.

10. The method of claim 9, wherein said network further comprises a plurality of repeaters that are integrated into a multi-repeater circuit, wherein said repeaters are linked to said integrated LAN controllers at said intelligent agent via repeater interface links.

11. The method of claim 9, wherein said multi-repeater circuit further comprises a port switching circuit that controls assignment of stations to repeater segments.

12. The method of claim 1, wherein said packet comprises a learning packet that is sent by, or on behalf of, said intelligent agent to implement uninterrupted network operation when stations are moved.

13. The method of claim 12, wherein said learning packet comprises a destination address, which is the address of said intelligent agent on the segment to which the station was moved.

14. The method of claim 12, wherein said learning packet comprises a source address, which is the address of the station that has moved.

15. The method of claim 12, wherein said learning packet comprises a length field, which indicates a valid length for said learning packet.

16. The method of claim 12, wherein said learning packet comprises DSAP, SSAP, and Control fields that prevent said intelligent agent or other intelligent network entities from performing special processing if a learning packet is received.

17. The method of claim 12, wherein said learning packet comprises a data field that may include a text message.

18. The method of claim 12, further comprising the step of:

causing transmission of said learning packet as soon as possible after said station is moved to reduce a period of time during which a bridge can fail to forward packets correctly to a destined station.

19. A method for maintaining uninterrupted network operation when stations are moved, comprising the steps of:

becoming aware of movement of a station from one repeater or one network to another;

determining a source address of said moved station;

causing a packet to be sent containing said source address of said station that was moved on either a new segment or to a new repeater for said station;

receiving said packet at a bridge, wherein said bridge learns a new port for said station; and updating a bridge filtering database;

wherein said station can then receive packets.

20. The method of claim 19, further comprising the step of:

providing a sufficient number of LAN controllers to address each of said bridge segments.

21. The method of claim 19, further comprising the steps of:

first selecting an interface through which said learning packet is to be sent; and then instructing a LAN controller to send said learning packet.

22. The method of claim 21, wherein said LAN controller comprises a DMA controller and a connection to a system bus.

23. The method of claim 21, wherein said LAN controller comprises a single LAN controller and a switching device connected between said LAN controller and a selected one of a plurality of available repeaters.

24. The method of claim 21, wherein said LAN controller actually transmits said learning packet onto said network.

25. The method of claim 21, further comprising the steps of:

providing a CPU that builds said learning packet in a memory and then instructs said LAN controller to read said learning packet from memory and transmit said learning packet to said network; and using said LAN controller to assert control over a repeater to which said station is moved to transmit said learning packet to said repeater to which said station was moved, and thence to a bridge, to allow said bridge to learn that said station has moved, as well as a new location of said station.

26. An apparatus for maintaining uninterrupted network operation when stations are moved, comprising:

an intelligent agent, said intelligent agent causing a packet to be sent by, or on behalf of, a station when said station is first moved via a new network segment; and means for causing an associated bridge to learn said station's new location and update said bridge's filtering database.

27. The apparatus of claim 26, wherein said intelligent agent causes said packet to be sent immediately after said station has been moved from one network segment to another.

28. The apparatus of claim 26, wherein said network is an Ethernet network.

29. The apparatus of claim 26, further comprising:

means for becoming aware of a station being moved; and thereafter means for transmitting a learning packet that is received at a port of the bridge that corresponds to a new station location.

30. The apparatus of claim 26, wherein said learning packet has a source address which is that of said station.

31. The apparatus of claim 26, wherein said intelligent agent comprises either a software-controlled CPU and memory, or an application specific integrated circuit, that are interconnected with a plurality of LAN controllers via a system bus.

32. The apparatus of claim 26, wherein said network comprises a plurality of repeaters that are linked to LAN controllers at said intelligent agent via corresponding links.

33. The apparatus of claim 32, wherein said intelligent agent becomes aware of when a station is moved from one repeater to another and causes a learning packet to be sent over an appropriate link to cause a bridge in question to update its filtering database.

34. The apparatus of claim 26, wherein said intelligent agent comprises either a software-controlled CPU and memory, or an application specific integrated circuit, that are connected to a multifunction circuit that includes a plurality of LAN controllers.

35. The apparatus of claim 34, wherein said network further comprises a plurality of repeaters that are integrated into a multi-repeater circuit, wherein said repeaters are linked to said integrated LAN controllers at said intelligent agent via repeater interface links.

36. The apparatus of claim 34, wherein said multi-repeater circuit further comprises:

a port switching circuit that controls assignment of stations to repeater segments.

37. The apparatus of claim 26, wherein said packet further comprises:

a learning packet that is sent by, or on behalf of, said intelligent agent to implement uninterrupted network operation when stations are moved.

38. The apparatus of claim 37, wherein said learning packet further comprises:

a destination address, which is the address of said intelligent agent on the segment to which the station was moved.

39. The apparatus of claim 37, wherein said learning packet further comprises:

a source address, which is the address of the station that has moved.

40. The apparatus of claim 37, wherein said learning packet further comprises:

a length field, which indicates a valid length for said learning packet.

41. The apparatus of claim 37, wherein said learning packet further comprises:

DSAP, SSAP, and Control fields that prevent said intelligent agent or other intelligent network entities from performing special processing if a learning packet is received.

42. The apparatus of claim 37, wherein said learning packet further comprises:

a data field that may include a text message.

43. The apparatus of claim 37, further comprising:

means for causing transmission of said learning packet as soon as possible after said station is moved to reduce a period of time during which a bridge can fail to forward packets correctly to a destined station.

44. An apparatus for maintaining uninterrupted network operation when stations are moved, comprising:

a mechanism that becomes aware of reassignment of a station from one repeater or one network to another;

a mechanism that determines a source address of said moved station, as well as a new segment for said source address;

a transmitter for sending a learning packet containing said source address of said station that was moved on either said new segment or to a new repeater for said station;

a receiver for receiving said learning packet at a bridge, wherein said bridge learns said new port of the station; and a mechanism that causes a bridge to update its filtering database;

wherein said station can then receive packets.

45. The apparatus of claim 44, further comprising:

a sufficient number of LAN controllers to address each of said bridge segments.

46. The apparatus of claim 44, further comprising:

means for first selecting an interface through which said learning packet is to be sent; and then for instructing a LAN controller to send said learning packet.

47. The apparatus of claim 45, wherein said LAN controller further:

comprises a DMA controller and a connection to a system bus.

48. The apparatus of claim 45, wherein said LAN further controller comprises:

a single LAN controller; and a switching device connected between said LAN controller and a selected one of a plurality of available repeaters.

49. The apparatus of claim 45, wherein said LAN controller actually transmits said learning packet onto said network.

50. The apparatus of claim 45, further comprising:

a memory; and a CPU that builds said learning packet in said memory and then instructs said LAN controller to read said learning packet from said memory and transmit said learning packet to said network.

51. The apparatus of claim 45, wherein said LAN controller asserts control over a repeater to which said station is moved to transmit said learning packet to said repeater to which said station was moved, and thence to a bridge, to allow said bridge to learn that said station has moved, as well as a new location of said station.

* * * * *